United States Patent [19]
Armstrong

[11] Patent Number: 5,603,471
[45] Date of Patent: Feb. 18, 1997

[54] DUCTED FAN TURBINE ENGINE NOZZLE ASSEMBLY

[75] Inventor: Norman Armstrong, Newtownards, Northern Ireland

[73] Assignee: Short Brothers PLC, Belfast, Northern Ireland

[21] Appl. No.: 211,213

[22] PCT Filed: Sep. 23, 1992

[86] PCT No.: PCT/GB92/01747

§ 371 Date: Mar. 23, 1994

§ 102(e) Date: Mar. 23, 1994

[87] PCT Pub. No.: WO93/06006

PCT Pub. Date: Apr. 1, 1993

[30] Foreign Application Priority Data

Sep. 27, 1991 [GB] United Kingdom .................. 9120658

[51] Int. Cl.⁶ .................................................. B64C 7/02
[52] U.S. Cl. .................................. 244/53 R; 244/110 B; 239/265.31; 415/119; 60/226.1
[58] Field of Search .............................. 244/129.4, 53 R, 244/54, 110 B; 235/265.31; 60/226.1, 226.2; 415/119; 248/554

[56] References Cited

U.S. PATENT DOCUMENTS 3,824,784  7/1979  Kitson et al. ...................... 239/265.31
4,772,033  9/1988  Nash ...................................... 277/174
5,136,839  8/1992  Armstrong ............................ 60/226.1
5,157,915  10/1992  Bart ......................................... 244/54

FOREIGN PATENT DOCUMENTS

2379433   9/1978   France ........................... B64D 29/00
587512    3/1943   United Kingdom .
614962    4/1947   United Kingdom .
784204    10/1957  United Kingdom .
981778    1/1965   United Kingdom .
1151729   5/1969   United Kingdom .
1231760   5/1971   United Kingdom .
1427990   3/1976   United Kingdom .
2202588   9/1988   United Kingdom ..................... 244/54
2225060   5/1990   United Kingdom .
WO9003309 4/1990   WIPO .
WO90/03309 4/1990  WIPO ........................... B64D 29/00

*Primary Examiner*—Galen L. Barefoot
*Attorney, Agent, or Firm*—Fish & Richardson P.C.

[57] ABSTRACT

A ducted fan turbine engine includes a nacelle and an outer discharge nozzle mounted on an aircraft wing by a pylon. The nacelle includes to parts which are hinged to the pylon for pivoting movement between an open position and a closed, operational position. Each nacelle part contains a bypass air duct. Spaced spigot locators and blade locators are positioned at the forward edge of the discharge nozzle and spigots and blades are correspondingly located round the rear edge of the nacelle parts. The locators and their corresponding spigots and blades are arranged so that on closure of the nacelle parts they engage one another and transmit the flight loads through the nacelle.

8 Claims, 8 Drawing Sheets

DUCTED FAN TURBINE ENGINE NOZZLE ASSEMBLY

The present invention relates to a ducted fan turbine engine by which is meant a gas turbine engine in which a portion of the net energy is used to drive a ducted fan. The invention is particularly concerned with the outer discharge nozzle of a ducted fan turbine engine.

In the operation of a ducted fan turbine engine air enters the engine core where it is ignited to rotate a turbine at the rear region of the engine. Rotation of the turbine rotates a fan in the forward region of the engine thereby directing by-pass air to flow rearwardly over the outside of the engine core. The main air stream in the engine core leaves the engine through an inner discharge nozzle, and the by-pass air leaves the engine through an outer discharge nozzle surrounding the inner nozzle.

The outer discharge nozzle is required to withstand the operational pressure conditions, inertia, acoustic fatigue, and creep or other temperature/strength/time-related forms of degradation. The outer discharge nozzle is also required to be constructed to facilitate engine removal.

In order to meet the above-mentioned operational requirements, conventional outer discharge nozzles have been constructed of heat-resistant, high strength/stiffness materials such as titanium, steel and Inconels, and these outer nozzles have either been permanently attached to the engine turbine case, or supported off the aft end of the by-pass duct fixed structure.

The above-mentioned materials are considerably more expensive than, for example, aluminium alloys both to obtain and to work. In addition these materials are relatively heavy which means that outer discharge nozzles constructed of these materials are correspondingly heavy and require suitably robust mounting supports.

In a conventional ducted fan turbine engine the outer nozzle is supported on the inner or primary nozzle by several struts or vanes extending between the two nozzles. Because of the considerable differences in operational temperature between the inner and outer nozzles, and also because of the internal burst pressure effects, the supporting vanes or struts are subjected to high stresses which cause deformation of both the nozzles. These stresses and deformations have to be allowed for in the design of the engine.

It is an aim of the invention to alleviate the above-mentioned disadvantages, and according to the invention there is provided a ducted fan turbine engine nozzle assembly comprising an inner assembly including an inner discharge nozzle, and an outer assembly having a nacelle and an outer discharge nozzle surrounding the inner discharge nozzle, characterised by mounting means whereby the outer discharge nozzle is detachably mounted on the nacelle for transmission of flight loads through the nacelle.

The outer discharge nozzle may be detachably mounted on the nacelle by a plurality of load transmitting connectors. These connectors may comprise spigots and blades on the nacelle which are adopted to be retained by locators on the outer discharge nozzle.

The outer discharge nozzle may be made of any suitable lightweight material such as for example a material formed predominantly of aluminium alloys.

Two examples of suitable aluminum alloys have the following specifications:

1) DTD 5070 produced by the Royal Aircraft Establishment, Farnborough
2) 2219 which is a US specification produced in the USA by the Aluminium Association Inc.

One embodiment of the invention will now be described by way of example with reference to the accompanying illustrative drawings in which.

Referring to the drawings, a ducted fan turbine engine 2 is mounted on an aircraft wing 4 by means of a pylon 6. The engine includes at its rear, an outer discharge nozzle 8 which is shaped in the form of a truncated hollow cone open at its forward and rear ends. The forward, larger diameter end abuts an engine nacelle 10, and the smaller diameter aft end is open to the atmosphere. The outer discharge nozzle 8 is constructed predominantly of aluminium alloys such as for example the previously mentioned aluminium alloys having the specifications DTD5070 and 2219.

Figure 3:
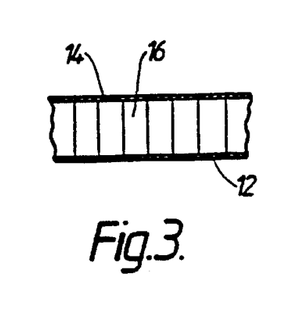
FIG. 3 is a sectional view of the outer walls of FIG. 2B.

Referring to FIG. 3, the outer discharge nozzle 8 is constructed of inner and outer sheet members 12 and 14 separated by a honeycomb core 16. The inner and outer sheet members and the core are made of an aluminium alloy, and the sheet members are attached to the honeycomb core by means of an adhesive. The inner sheet member 12 is perforated in order to provide sound attenuation.

The outer discharge nozzle 8 is mounted coaxially with an inner discharge nozzle 18 through which the hot engine gases are exhausted from the engine core 20.

Figure 2A:
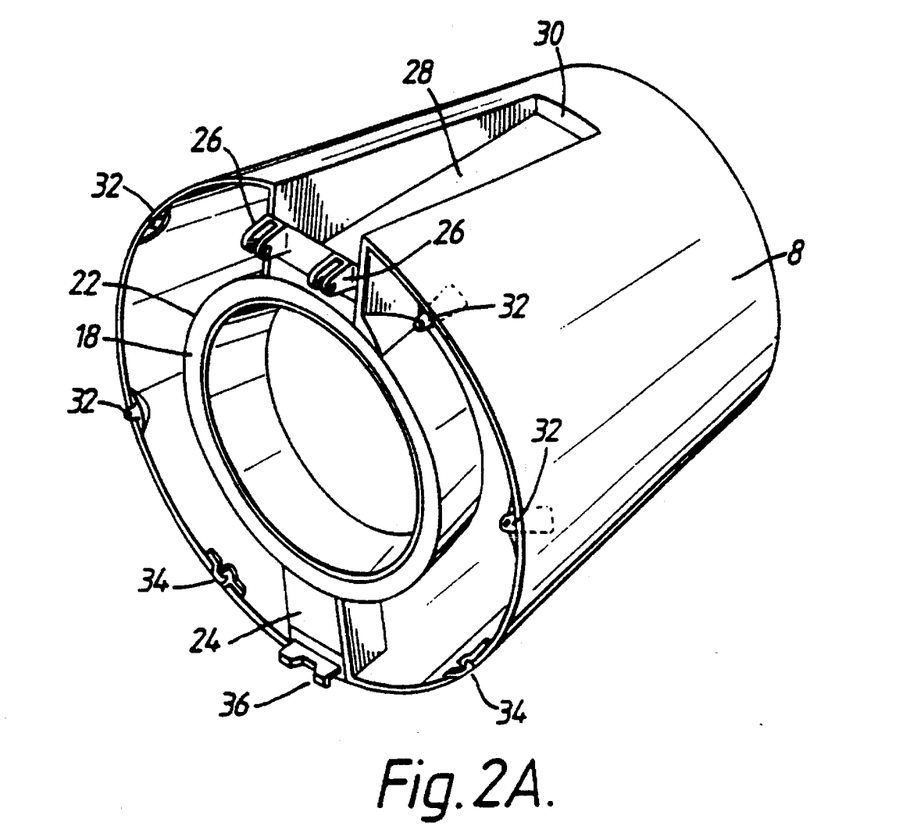
FIG. 2A is a perspective view of the inner and outer discharge nozzles of a fan jet engine.

As shown in FIG. 2A, a primary nozzle fairing 22 surrounds the inner discharge nozzle 18, and is coaxial with the inner and outer discharge nozzles 18 and 8. This nozzle fairing 22 smooths the by-pass air in the region of the outer discharge nozzle 8.

Figure 1A:
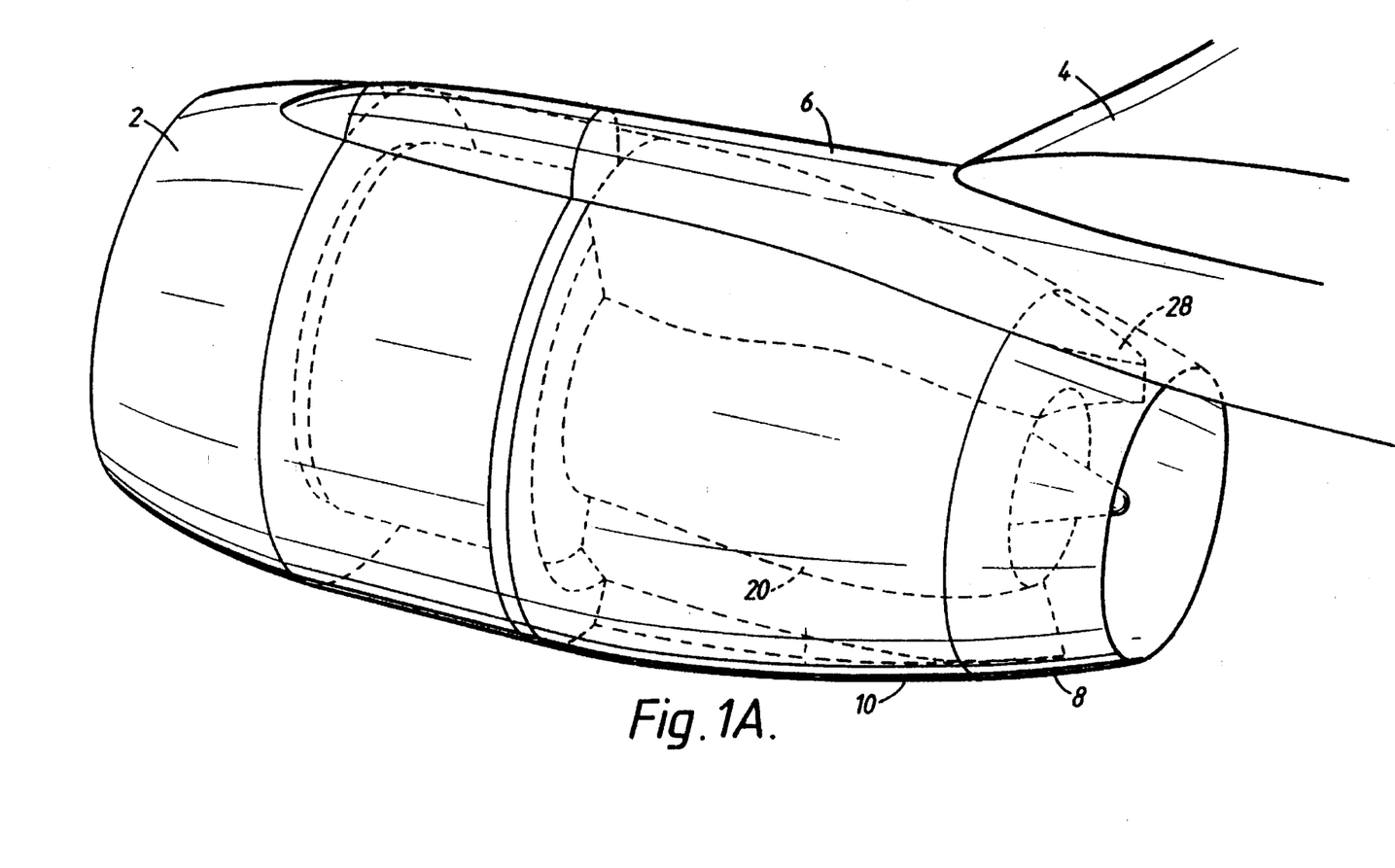
FIG. 1A is a perspective view of a ducted fan turbine engine mounted on an aircraft wing.
Figure 1B:
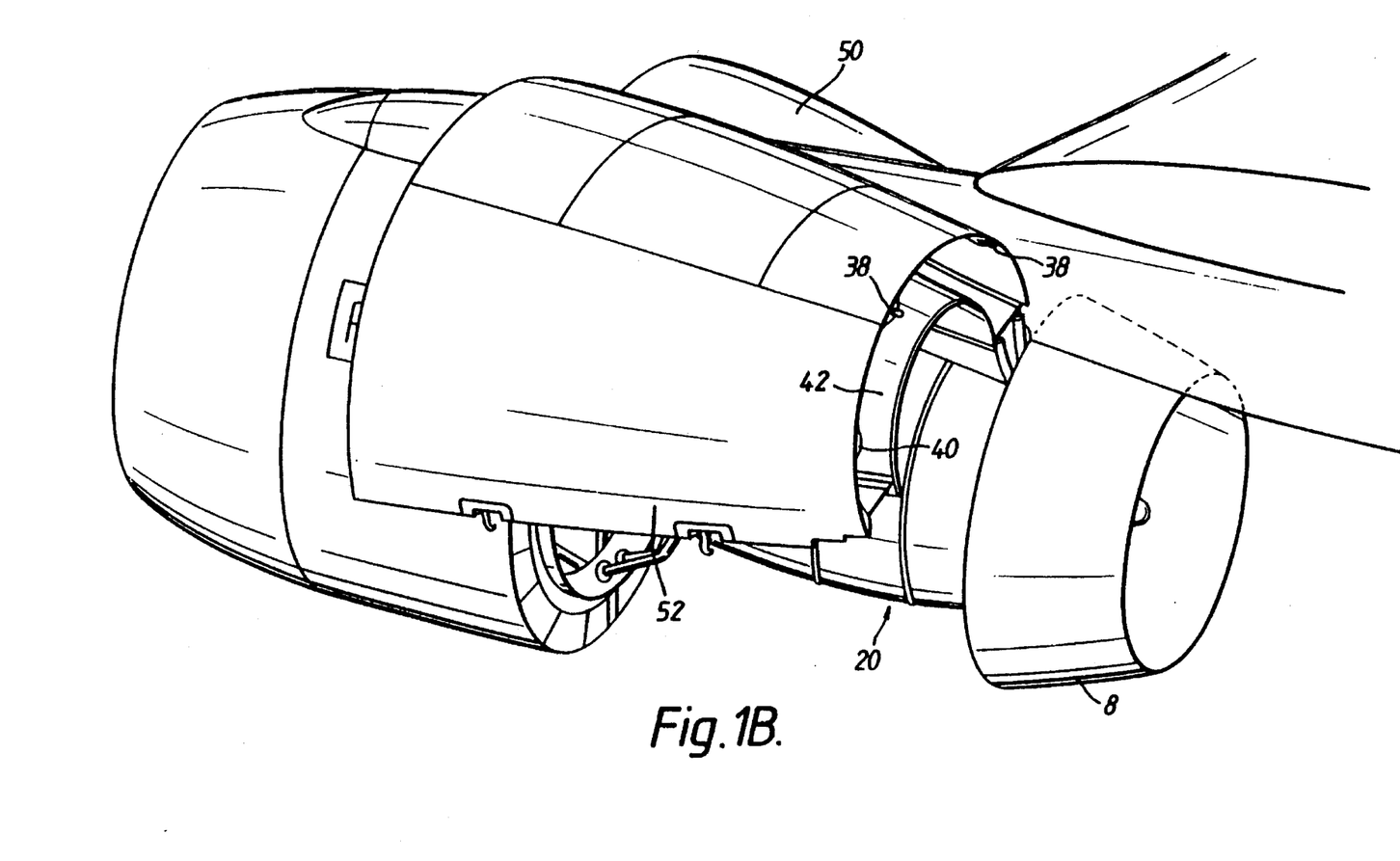
FIG. 1B is a perspective view of the engine of FIG. 1A with the by-pass air ducts in their open position.

Referring to FIG. 1B the nacelle 10 is formed in two parts 50 and 52 which are hinged to the pylon 6 so as to be pivoted between a closed operational position and the illustrated open position. Each nozzle part 50 and 52 contains a by-pass air duct 42 of c-shaped cross-section. When the nozzle parts 50 and 52 are in the closed position these ducts 42 constitute the by-pass air path of the engine.

The primary nozzle fairing 22 is of hollow truncated conical form open at both ends. Its larger diameter (forward) end lies in a plane approximately parallel to and forward of the plane of the forward edge of the outer discharge nozzle 8.

This primary nozzle fairing 22 is attached to the outer discharge nozzle 8 and is not attached to the inner discharge nozzle 18.

A bifurcation trailing edge 24 is located between the lower forward part of the inner face of the outer discharge nozzle 8 and the lower forward part of the primary nozzle fairing 22. This trailing edge 24 provides a smooth aerodynamic recombination of the left-hand and right-hand by-pass air-flows through the engine into a single air-flow within the region of the outer discharge nozzle 8. This trailing edge 24 is attached to both the outer discharge nozzle 8 and the primary nozzle fairing 22, and extends a short distance rearwardly of the forward part of the outer discharge nozzle 8 and primary nozzle fairing 22.

The primary nozzle fairing 22 consists of a conical outer skin with internal ring stiffening members and is supported by the outer discharge nozzle 8 through its attachment to a fairing 26 and the lower bifurcation trailing edge 24.

Figure 2B:
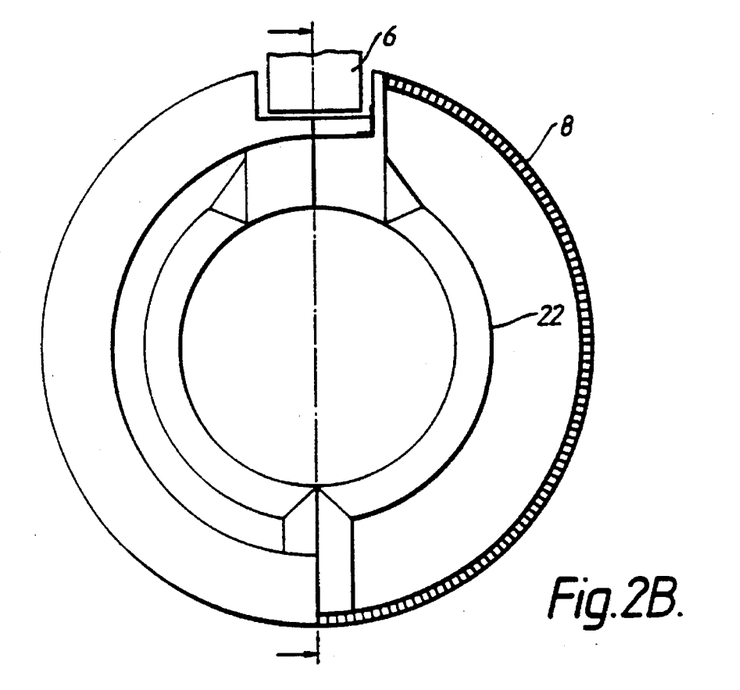
FIG. 2B is a diagrammatic sectional view of a forward part of FIG. 2A.
Figure 2C:
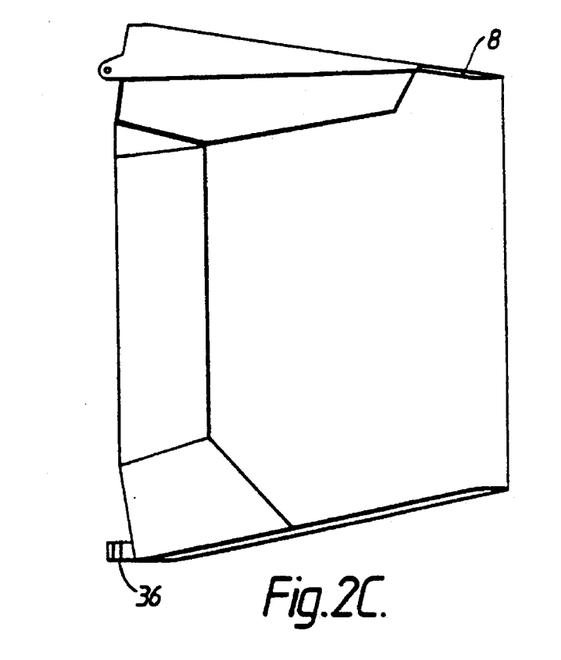
FIG. 2C is a side sectional view of FIG. 2B.
Figure 2D:
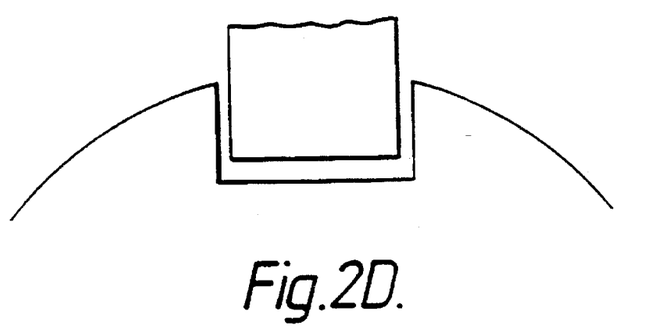
FIG. 2D is a diagrammatic view illustrating the mounting of the outer discharge nozzle of FIG. 2A.

Referring particularly to FIGS. 2A and 2B two support fittings 26 are located at the forward upper portion of the outer discharge nozzle 8. These support fittings 26 are bolted to appropriate parts of the aircraft pylon 6 to hold the nozzle assembly in position when the C ducts 42 are open for inspection, repair or overhaul of the engine.

The support fittings 26 and the projection of the aircraft pylon 6 into the outer discharge nozzle are separated from the by-pass air flow-paths by the fairing 28 having its forward end located at the upper part of the primary nozzle fairing 22. This fairing 28 extends rearwardly and outwardly toward the inner surface of the outer discharge nozzle 8 and meets this inner surface closely behind the end wall 30.

Figure 4:
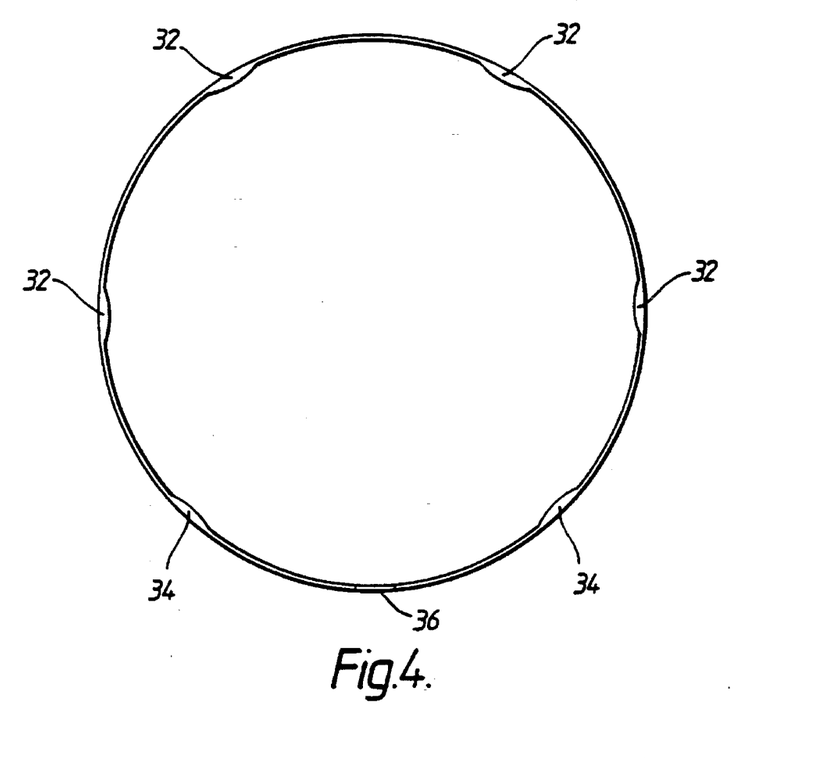
FIG. 4 is a diagrammatic sectional view indicating the circumferential distribution of locators around the forward edge of the outer discharge nozzle.
Figure 5A:
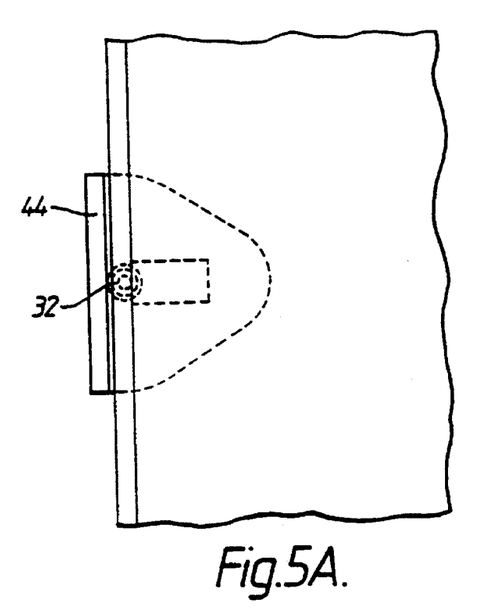
FIG. 5A is a side view of a typical spigot receptacle and blister fairing.
Figure 5B:
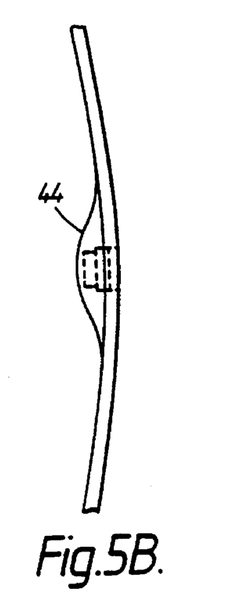
FIG. 5B is a sectional view of FIG. 5A.
Figure 6:
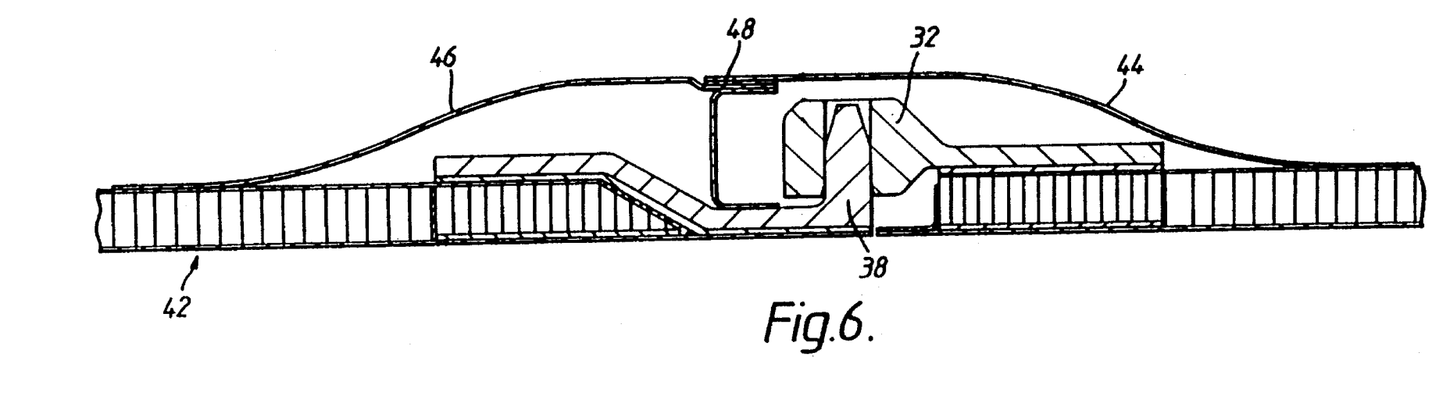
FIG. 6 is an enlarged cross-sectional view of a typical spigot and locator in the closed position.
Figure 7:
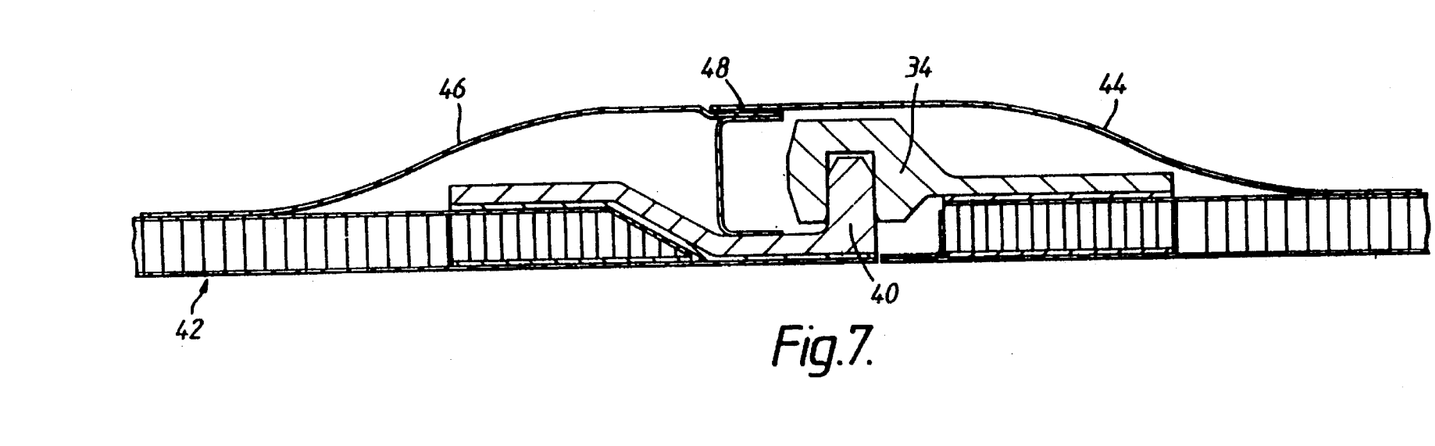
FIG. 7 is an enlarged cross-sectional view of a typical blade and locator in the closed position.

Referring to FIGS. 2A and 4, four spigot locators 32, and two blade locators 34, are distributed circumferentially around the forward edge of the nozzle 8. A lower "V" locator 36 is positioned at the forward end of the bifurcation trailing edge 24. Spigots 38 and blades 40 are correspondingly located around the rear outside edge of the nacelle parts 50, 52.

The locators 32, 34 and 36 and their corresponding spigots/blades are arranged such that on closure of the C ducts 42 they engage one another and hold the nozzle and C ducts firmly and closely abutting.

The engagement of said spigots 38 and blades 40 removes load from the support fittings 26, thereafter all flight and ground loads are transmitted from the nozzle to the nacelle and aircraft structure via said spigots 38 and blades 40.

Figure 8:
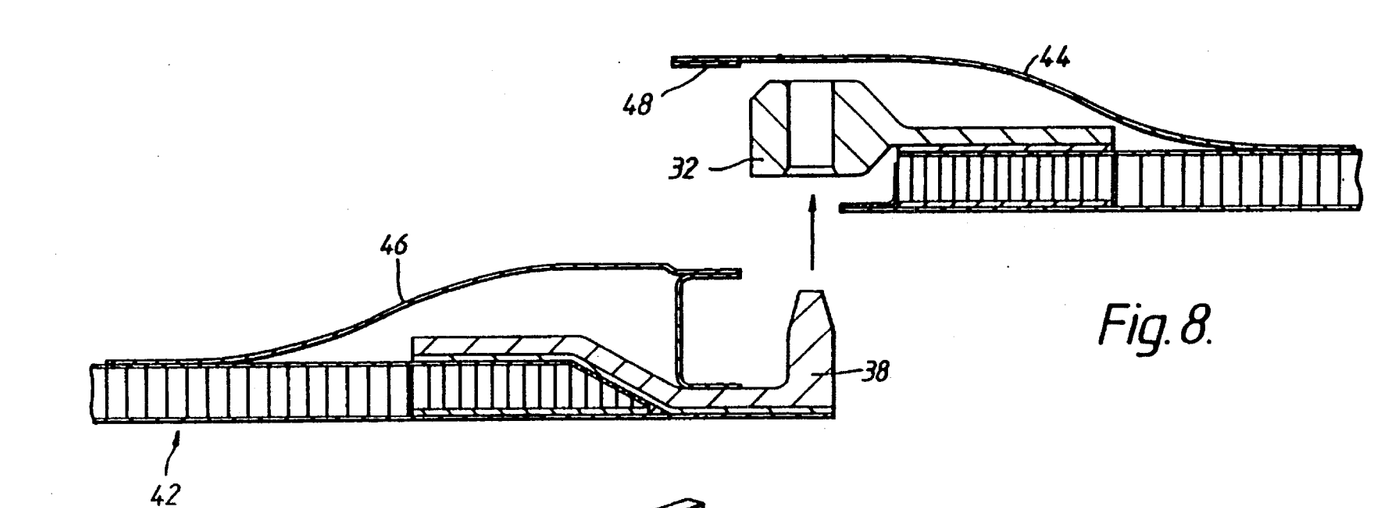
FIG. 8 is an enlarged cross-sectional view of the closing action of a spigot into its locator.
Figure 9:
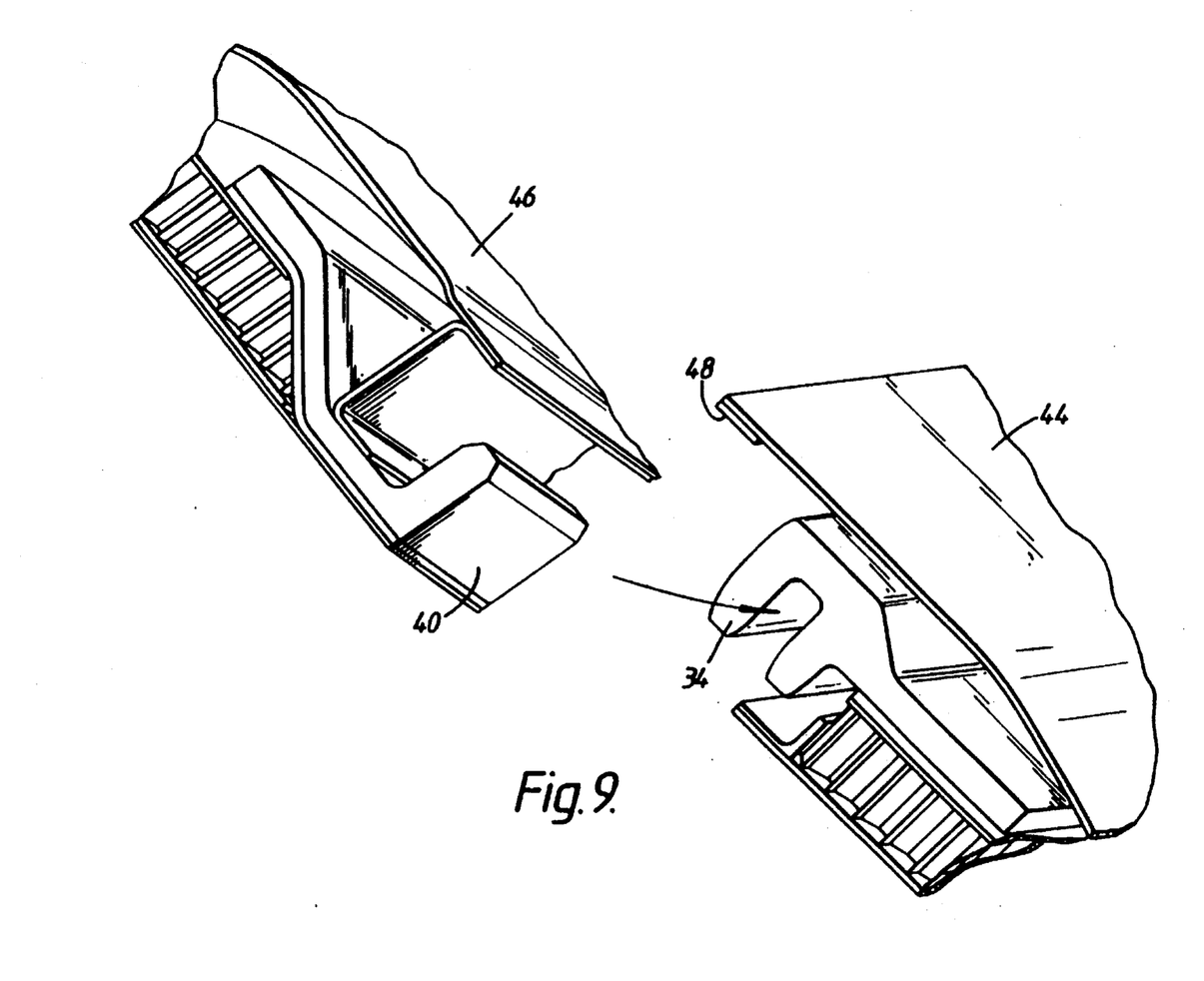
FIG. 9 is an enlarged sectional view of the closing action of a blade into its locator.
Figure 10:
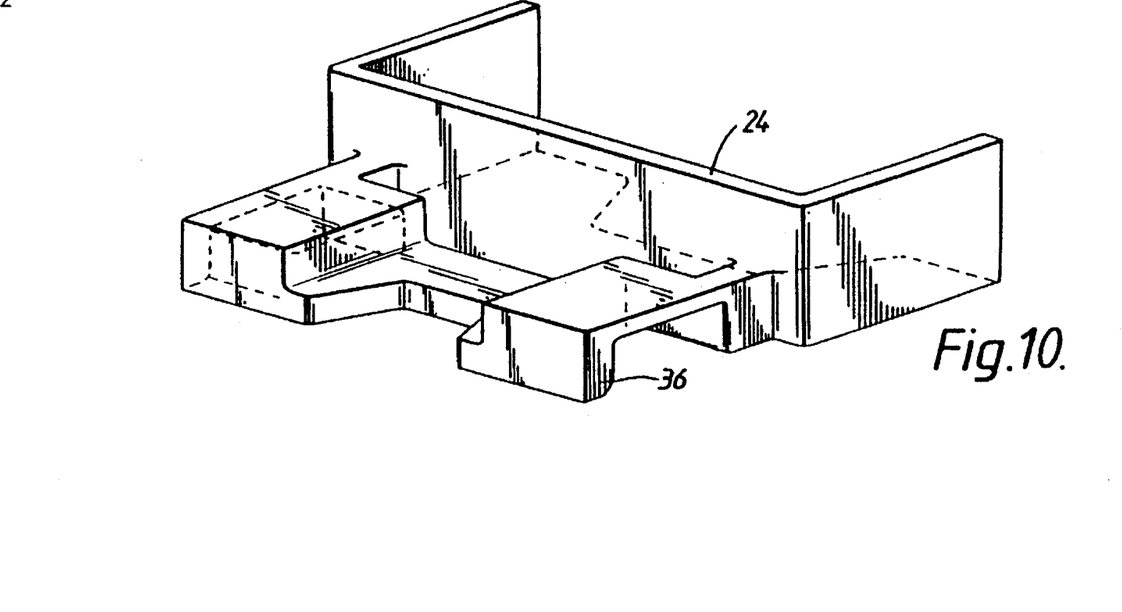
FIG. 10 is an enlarged perspective view of the lower locator.

The nacelle parts 50, 52 configuration and the nature and location of the mounting hinge of each nacelle part 50 and 52 dictate the path followed by the spigots and blades upon closure of the C ducts. Around the upper periphery the path is sufficiently linear for spigots to be used as shown in FIG. 8. Referring to FIG. 9 around the lower periphery the closure path is curved significantly enough to require blades 40 and a lower locator 34 to be used in place of spigots.

In this embodiment of the invention, the outer discharge nozzle 8 and the primary fairing 22 are movable between a forward operational position adjacent the nacelle 10 and a rearward park position, as described in International Application Publication No. W090/00309.

When the engine is assembled, the lower part of the pylon 6 is located in the upper part of the outer discharge nozzle 8, and bolted to the support fittings 26. The nacelle parts 50 and 52 are closed to engage the locators 32, 34 and 36 and their corresponding spigots 38 and blades 40. These engaged spigots 38 and blades 40 and their locators 32, 34 and 36 transmit all the flight and ground loads between the nozzle, the nacelle and the aircraft structure. These flight and ground loads are not transmitted through the support fittings 26 which are used to support the outer discharge nozzle assembly when the nacelle parts 50, 52 are in their open position.

To remove the remainder of the engine the support fittings 26 are unbolted from the pylon 6, the nacelle parts 50, 52 are pivoted to their open position thereby releasing the spigots 38 and blades 40 from their locators 32, 34 and 36, and the outer discharge nozzle 8 and fairing 22 are rolled rearwardly to a park position.

Referring to FIGS. 5, 6, 7, 8 and 9 each spigot locator 32 and blade locator 34 is enclosed by a half blister fairing 44 open at its forward end. Each spigot 38 and blade 40 is also enclosed by a half blister fairing 46 open at its rear end.

Upon closure of the nacelle parts 50, 52, corresponding half blister fairings 44 and 46 come together to form complete blister fairings which separate the by-pass air-flow from the enclosed spigot 38, blade 40 and locator 32 and 34. A bed of Thiokol 48 between the closing edges of each pair of half blister fairings 44 and 46 maintains an air-tight seal between them.

An advantage of the invention is that the outer discharge nozzle 8 can be made of aluminium alloys which are considerably lighter and cheaper than the materials required in the conventional construction of outer nozzle assemblies. Aluminium alloys have not previously been used in the construction of conventional outer nozzles because of their poor high-temperature performance. During normal operation of a ducted fan turbine engine the hot gases exhausting from the core are shrouded by the cooler by-pass air and therefore do not impinge on the outer discharge nozzle structure. During operation of the thrust reverse, however, the by-pass air is diverted forwardly and no longer shrouds the hot exhaust gases from the core. It is envisaged that the outer discharge nozzle 8 will be exposed on its inner surface to an air-stream at elevated temperature for a short period during each flight. By fabricating the outer discharge nozzle 8 so that there is a good thermal pathway between the inner and outer faces of the outer discharge nozzle 8 and by cooling the outer faces of the outer discharge nozzle 8 by the external air flow during flight, the heat impinging on the inner face of the outer discharge nozzle is dissipated in and by the outer face.

Other methods of accommodating high temperatures on the outer discharge nozzle 8 include:

i) Leaking air past the thrust reverser, ii) Local use of high temperature materials, iii) Aluminium oxide or other insulating spray treatment applied to the nozzle acoustic skin face.

The adhesive used in the construction of the outer discharge nozzle 8 must have the following properties:

1) It must not break the thermal pathway between the inner and outer sheet members 12 and 14.

2) It must be capable of being applied in a manner and form that does not occlude the perforations of the inner sheet member 12, and 3) It must retain its properties through the operational life of the outer discharge nozzle 8 and throughout the operational temperature range encountered.

I claim:

1. A ducted fan turbine engine nozzle assembly comprising an inner assembly including an inner discharge nozzle and an outer assembly having a nacelle and an outer discharge nozzle characterized by mounting means whereby the outer discharge nozzle is detachably mounted on the nacelle for transmission of substantially all flight loads through the nacelle.

2. An assembly as claimed in claim 1, characterised in that the mounting means comprise a plurarity of load transmitting connectors.

3. An assembly as claimed in claim 2, characterised in that the connectors comprise spigots and blades on the nacelle which are adapted to be retained by locators on the outer discharge nozzle.

4. An assembly as claimed in claim 3, characterised in that the spigots and blades are mounted on nacelle parts (50, 52) which are moveable between a closed operational position and an open position.

5. An assembly as claimed in claim 4, characterised in that the nacelle parts (50, 52) are pivotally moveable between their closed and open positions.

6. An assembly as claimed in claim 5, characterised in that the action of moving the nacelle parts (50, 52) to the closed position, engages the spigots and the blades with their respective locators.

7. An assembly as claimed in claim 6, characterised in that each nacelle part (50, 52) contains a bypass air-duct.

8. An assembly as claimed in claim 7, characterised in that on closure of the nacelle parts half blister fairings on the nacelle parts and outer discharge nozzle combine to form complete blister fairings which separate the bypass airflow from the enclosed spigots blades and locators.

\* \* \* \* \*